US011321467B2

(12) United States Patent
Wang et al.

(10) Patent No.: US 11,321,467 B2
(45) Date of Patent: *May 3, 2022

(54) SYSTEM AND METHOD FOR SECURITY ANALYSIS

(71) Applicant: Beijing DiDi Infinity Technology and Development Co., Ltd., Beijing (CN)

(72) Inventors: Xiaodan Wang, Los Altos, CA (US); Liwei Ren, San Jose, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 285 days.

This patent is subject to a terminal disclaimer.

(21) Appl. No.: 16/416,018

(22) Filed: May 17, 2019

(65) Prior Publication Data

US 2020/0065498 A1 Feb. 27, 2020

Related U.S. Application Data

(63) Continuation-in-part of application No. 16/106,470, filed on Aug. 21, 2018.

(51) Int. Cl.
*H04L 29/06* (2006.01)
*G06F 21/57* (2013.01)

(52) U.S. Cl.
CPC ........ *G06F 21/577* (2013.01); *H04L 63/1433* (2013.01); *G06F 2221/033* (2013.01)

(58) Field of Classification Search
CPC ............. H04L 63/1433; H04L 63/1416; H04L 63/1425; H04L 63/1408; G06F 21/577; G06F 2221/033; H04W 12/12
See application file for complete search history.

(56) References Cited

U.S. PATENT DOCUMENTS

| 7,418,733 | B2 | 8/2008 | Connary et al. | |
| 7,865,958 | B2 * | 1/2011 | Lieblich | H04L 63/20 726/25 |

(Continued)

OTHER PUBLICATIONS

PCT International Search Report and the Written Opinion dated Mar. 25, 2019, issued in related International Application No. PCT/US2018/067983 (9 pages).

(Continued)

*Primary Examiner* — Trang T Doan
(74) *Attorney, Agent, or Firm* — Sheppard Mullin Richter & Hampton LLP

(57) ABSTRACT

Methods, systems, and apparatus, including computer programs encoded on computer storage media, for security analysis are provided. One of the methods includes: determining a data risk value for data of an endpoint based on a number of classified files within the data and a type of classified files within the data; determining an endpoint risk value for the endpoint based on a user risk value and a cyber security risk value; determining a channel risk value for a set of channels through which the data is conveyable by the endpoint based on a number of channels within the set of channels and a type of channels within the set of channels; and rendering a map showing a security risk level of the endpoint, wherein the security risk level is based on the data risk value, the endpoint risk value, and the channel risk value.

18 Claims, 9 Drawing Sheets

(56) References Cited

U.S. PATENT DOCUMENTS

| | | | | |
|---|---|---|---|---|
| 8,122,510 B2* | 2/2012 | Byers | ............... | H04L 63/1433 |
| | | | | 726/25 |
| 9,438,618 B1* | 9/2016 | Sultan | ............... | H04L 63/1433 |
| 10,296,751 B2* | 5/2019 | Boudreau | ............... | G06F 21/62 |
| 2005/0114186 A1 | 5/2005 | Heinrich | | |
| 2009/0178142 A1* | 7/2009 | Lieblich | ............... | H04L 63/14 |
| | | | | 726/25 |
| 2010/0275263 A1* | 10/2010 | Bennett | ............... | G06F 21/577 |
| | | | | 726/25 |
| 2014/0325670 A1 | 10/2014 | Singh et al. | | |
| 2015/0205954 A1* | 7/2015 | Jou | ............... | G06F 21/316 |
| | | | | 726/22 |
| 2016/0156655 A1 | 6/2016 | Lotem et al. | | |
| 2016/0253503 A1* | 9/2016 | Berry | ............... | G06F 21/577 |
| | | | | 726/25 |
| 2018/0018602 A1 | 1/2018 | DiMaggio et al. | | |
| 2018/0024943 A1* | 1/2018 | Xu | ............... | G06F 21/577 |
| | | | | 711/163 |
| 2018/0027006 A1 | 1/2018 | Zimmermann et al. | | |
| 2018/0060591 A1 | 3/2018 | Dobrila et al. | | |
| 2018/0144138 A1* | 5/2018 | Zhang | ............... | H04L 63/1433 |
| 2018/0375877 A1 | 12/2018 | Jakobsson et al. | | |
| 2019/0036971 A1 | 1/2019 | Ford et al. | | |
| 2019/0205926 A1* | 7/2019 | Qiu | ............... | H04L 63/1441 |

OTHER PUBLICATIONS

Non-Final Office Action dated Jan. 4, 2021, issued in related U.S. Appl. No. 16/106,470 (19 pages).

Final Office Action dated Jun. 7, 2021, issued in related U.S. Appl. No. 16/106,470 (25 pages).

Non-Final Office Action dated Nov. 12, 2021, issued in related U.S. Appl. No. 16/106,470 (21 pages).

PCT International Preliminary Report on Patentability dated Mar. 4, 2021, issued in related International Application No. PCT/US2018/067983 (9 pages).

* cited by examiner

|  | Data risk | Cyber security risk | User risk |
|---|---|---|---|
| Deivce ID | ● Leak ○<br>Red | ● Threat ○<br>Purple | User behavior ○<br>Yellow |
| Deivce ID <u>900</u> | ◉ Risk scores | ◉ Risk scores | ◉ Risk scores |
| Deivce ID | ◉ Risk scores | ◉ Risk scores | |
| Deivce ID | ◉ Risk scores | | ◉ Risk scores |
| Deivce ID | ◉ Risk scores | | |
| Deivce ID | | ◉ Risk scores | |
| Deivce ID | | ◉ Risk scores | ◉ Risk scores |
| Deivce ID | | | ◉ Risk scores |

Color code

|  Alarm |  High risk |  Multiple risks |  Multiple risks |
|---|---|---|---|
| Red normal size icon | Red large size icon | Red, purple, yellow large size icon | Red, purple large size icon |

FIG. 1E

SYSTEM AND METHOD FOR SECURITY ANALYSIS

CROSS REFERENCE TO RELATED APPLICATION

The present application is a continuation-in-part application of U.S. Non-provisional patent application Ser. No. 16/106,470, filed on Aug. 21, 2018 and entitled "Data Security Risk Evaluation For Threat Detection", which is incorporated herein by reference in its entirety.

TECHNICAL FIELD

The disclosure relates generally to evaluating and rendering endpoint security risks.

BACKGROUND

Computing systems may be subject to various security threats, such as data leakage, data corruption, unauthorized access, and/or unauthorized control. Detection of threats based on particular events at a computing system may require individual events and different combinations of events to be coded. Such methods may neither provide flexible threat detection, nor take into account different aspects of a computing system, such as data resting at the computing system, vulnerabilities of the computing system, behavior of users of the computing system, or channels through which the computing system may convey information. Further, there lacks a straightforward method for presenting and monitoring such threats for the purpose of risk mitigation. Therefore, it is desirable to provide security analysis solutions that can detect various security threats and visually render risk levels in a network topology.

SUMMARY

Various embodiments of the specification include, but are not limited to, systems, methods, and non-transitory computer readable media for security analysis.

In some embodiments, a computer-implemented security analysis method comprises: determining a data risk value for data of an endpoint (e.g., computing device) based on a number of classified files within the data and a type of classified files within the data; determining an endpoint risk value for the endpoint based on a user risk value and a cyber security risk value; determining a channel risk value for a set of channels through which the data is conveyable by the endpoint based on a number of channels within the set of channels and a type of channels within the set of channels; and rendering a map showing a security risk level of the endpoint, wherein the security risk level is based on the data risk value, the endpoint risk value, and the channel risk value.

In some embodiments, rendering the map showing the security risk level of the endpoint comprises: determining a data security risk value based on the data risk value, the endpoint risk value, and the channel risk value; and rendering the map based on the data security risk value.

In some embodiments, the security risk level is based on the data risk value, the endpoint risk value, the channel risk value, and an amount of data accessible by the endpoint.

In some embodiments, the endpoint comprises a computing device; and rendering the map showing the security risk level of the endpoint comprises: rendering the map showing the endpoint and its connection with one or more other endpoints in a network and showing one or more risk levels of the one or more other endpoints.

In some embodiments, the security risk level is represented by an icon with at least one of an associated color, size, or shape.

In some embodiments, the user risk value is determined based on a user behavior associated with the data or the endpoint.

In some embodiments, the cyber security risk value is determined based on a number of vulnerabilities of the endpoint.

In some embodiments, a security analysis system comprises one or more processors and one or more non-transitory computer-readable memories coupled to the one or more processors and configured with instructions executable by the one or more processors to cause the system to perform operations comprising: determining a data risk value for data of an endpoint based on a number of classified files within the data and a type of classified files within the data; determining an endpoint risk value for the endpoint based on a user risk value and a cyber security risk value; determining a channel risk value for a set of channels through which the data is conveyable by the endpoint based on a number of channels within the set of channels and a type of channels within the set of channels; and rendering a map showing a security risk level of the endpoint, wherein the security risk level is based on the data risk value, the endpoint risk value, and the channel risk value.

In some embodiments, a non-transitory computer-readable storage medium for security analysis is configured with instructions executable by one or more processors to cause the one or more processors to perform operations comprising: determining a data risk value for data of an endpoint based on a number of classified files within the data and a type of classified files within the data; determining an endpoint risk value for the endpoint based on a user risk value and a cyber security risk value; determining a channel risk value for a set of channels through which the data is conveyable by the endpoint based on a number of channels within the set of channels and a type of channels within the set of channels; and rendering a map showing a security risk level of the endpoint, wherein the security risk level is based on the data risk value, the endpoint risk value, and the channel risk value.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the specification. It is to be understood that the foregoing general description and the following detailed description are exemplary and explanatory only, and are not restrictive of the specification, as claimed.

BRIEF DESCRIPTION OF THE DRAWINGS

Non-limiting embodiments of the specification may be more readily understood by referring to the accompanying drawings in which:

FIG. 1E illustrates an exemplary list showing security risk levels, in accordance with various embodiments of the disclosure.

DETAILED DESCRIPTION

Non-limiting embodiments of the present specification will now be described with reference to the drawings. Particular features and aspects of any embodiment disclosed herein may be used and/or combined with particular features and aspects of any other embodiment disclosed herein. Such embodiments are by way of example and are merely illustrative of a small number of embodiments within the scope of the present specification. Various changes and modifications obvious to one skilled in the art to which the present specification pertains are deemed to be within the spirit, scope and contemplation of the present specification as further defined in the appended claims.

Figure 1A:
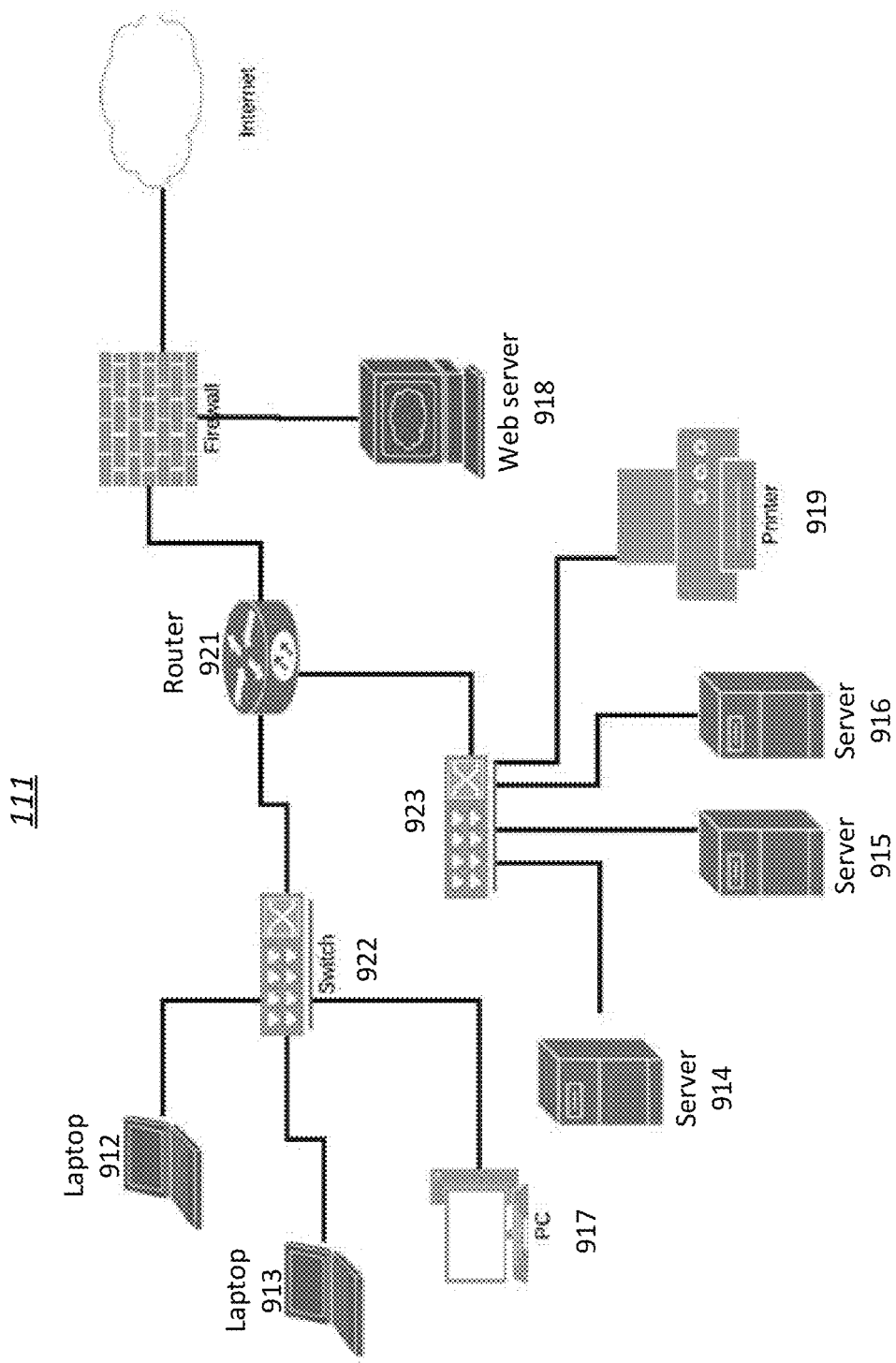
FIG. 1A illustrates an exemplary environment for performing security analysis, in accordance with various embodiments of the disclosure.

The approaches disclosed herein improve technologies for evaluating risks and detecting threats to computing systems, such as the computing system 111 shown in FIG. 1A. The computing system 111 may comprise various endpoints such as computers (917), laptops (912 and 913), servers (914-916, 918), printers (919), or other computing devices connected through switches (922 and 923), routers (921), etc. The computing system 111 may couple to the internet through one or more of the endpoints. By using a triplet model for evaluating data security risks, flexible threat detection that takes into account different aspects of the computing system may be provided. The triplet model for evaluating security risks may provide for evaluation and detection of threat using risk values for (1) an endpoint, (2) data at the endpoint, and (3) channels through which data is conveyable by the endpoint. By separately determining risks associated with the three different aspects of the computing system, granular measurements of risk may be calculated based on user behavior and endpoint vulnerabilities, and the granular measurements may be weighed or adjusted based on the risks posed by the data and the channels. Separating the risk determination into three elements of the triplet model may facilitate independent changes, updates, or optimization of risk calculations for the separate elements. Further, these elements may be used individually or collectively for rendering risk levels of the endpoint. For example, the risk levels of the various endpoints in FIG. 1A may be visualized in distinct colors, such that analysts can intuitively monitor security threats and carry out loss prevention measures.

Figure 1B:
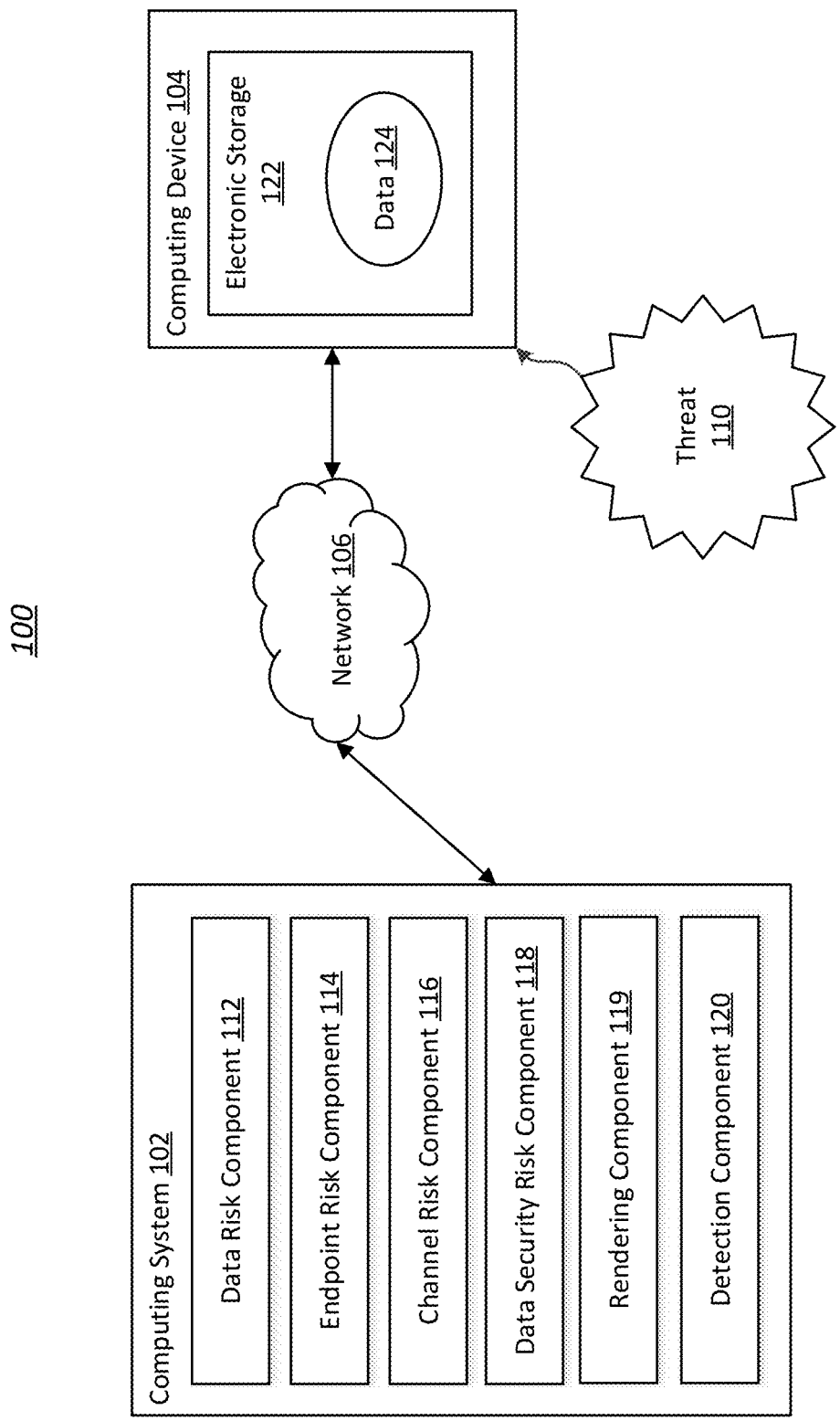
FIG. 1B illustrates an exemplary environment for performing security analysis, in accordance with various embodiments of the disclosure.

FIG. 1B illustrates an exemplary environment 100 for performing security analysis, in accordance with various embodiments. The exemplary environment 100 may include a computing system 102 (e.g., a server) and a computing device 104 (e.g., a client device, desktop, laptop, smartphone, tablet, mobile device). The computing system 102 and the computing device 104 may each include one or more processors and one or more memories (e.g., permanent memory, temporary memory, non-transitory computer-readable storage medium). The processor(s) may be configured to perform various operations by interpreting machine-readable instructions stored in the memory. One or both of the computing system 102 and the computing device 104 may include other computing resources or have access (e.g., via one or more connections/networks) to other computing resources. The computing system 102 may comprise one or more components described below, one or more of which may be optional. In one embodiment, each component may be a module configured to perform steps described below. In one embodiment, each component may comprise instructions stored in a non-transitory computer-readable storage medium. When the instructions are executed by a processor, the computing system 102 or the each component may be caused to perform steps described below.

The computing system 102 may include a data risk component 112, an endpoint risk component 114, a channel risk component 116, a data security risk component 118, a rendering component 119, and a detection component 120. The computing system 102 may include other components. The computing system 102 and the computing device 104 may be connected through one or more networks (e.g., a network 106). The computing system 102 and the computing device 104 may exchange information using the network 106. The computing system 102 and the computing device 104 may communicate over the network 106 using one or more communication protocols. The computing system 102 may be a server of the network 106 and the computing device 104 may be a node of the network 106. The computing device 104 may be one of the endpoints of the computing system 111 shown in FIG. 1A. Although only computing device 104 is shown in this figure as an exemplary endpoint for which security threats are monitored, the same security analysis method can be applied to other endpoints, especially those connected to the network 106.

While the computing system 102 and the computing device 104 are shown in FIG. 1B as single entities, this is merely for ease of reference and is not meant to be limiting. One or more components or functionalities of the computing system 102 or the computing device 104 described herein may be implemented in a single computing device or multiple computing devices. For example, one or more components/functionalities of the computing system 102 may be implemented in the computing device 104 or distributed across multiple computing devices. For instance, the computing device 104 may represent a computing platform, such as an email system and/or a file server, and the components/functionalities of the computing system 102 may be implemented within the computing platform or in one or more other computing devices.

The computing device 104 may include an electronic storage 122. The electronic storage 122 may refer to a device for storing information, such as information defining computer files. The electronic storage 122 may include one or more storage media in which information may be stored. For example, the electronic storage 122 may include optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), or other electronically readable storage media. The electronic storage may be part of the computing device 104 (e.g., integrated into the computing device 104) or removably coupled to the computing device 104.

The electronic storage 122 may store data 124 and other information. The data 124 may refer to information that is formatted for storage or used by one or more computing devices. For example, the data 124 may include one or more electronic files, executable programs, configuration files, program settings, registry information, or other information stored or used by computing devices. For instance, the data 124 may include one or more classified files. A file may refer to a collection of data or information that has a name (e.g., filename). The data 124 may include one or more files of the same type. The data 124 may include files of different types. For example, the data 124 may include one or more of the following file types: data files, text files, program files, directory files, system files. Other types of files are contemplated. Files within the data 124 may be stored within a single storage media or across multiple storage media. Files within the data 124 may be stored within a single file directory or across multiple file directories. Other types of information within the data 124 are contemplated.

A classified file may refer to a file associated with one or more classification categories. Classification categories may refer to classes, groupings, or divisions to which files may belong based on contents of the files. Classification categories may identify one or more types of contents of the files. For example, a classification category with which a file is associated may indicate a level or an amount of sensitive information contained within the file. As another example, a classification category with which a file is associated may indicate a level or an amount of classified information contained within the file. Other types of classification categories are contemplated.

In some embodiments, a file may be associated with multiple classification categories. For example, a file may be associated with multiple types of classification categories. As another example, different portions of a file may be associated with different classification categories. For instance, one part of the file may be associated with a low classification category while another part of the file may be associated with a high classification category.

The classification categories may determine which users or which groups of users are authorized to access the files. Authorized access of a file may be divided into different types of access. For example, a user's full access to a file may include the user being authorized to open the file, rename the file, add a property to the file, remove a property of the file, change a property of the file, copy the file, delete the file, change the location of the file, share the file, view information in the file, add information to the file, remove information from the file, change information in the file, and otherwise access the file. A user's limited access to a file may include the user being authorized to perform only a subset of activities authorized under full access.

The computing device 104 may be subject to a threat 110. The threat 110 may refer to potential unauthorized action, occurrence, or event relating to the computing device 104. For example, the threat 110 may include the possibility of the data 124 (or a portion of the data 124) being subject to unauthorized access or modification, such as by an unauthorized user or an unauthorized program that exploits vulnerabilities of the computing device 104, another computing device connected to the computing device 104, or the network 106. For instance, the threat 110 may include an unauthorized user attempting to access the data 124, or a malicious program running on the computing device 104 attempting to destroy or steal the data 124. As another example, the threat 110 may include an unauthorized user or an unauthorized program attempting to install or run unauthorized programs on the computing device 104 or attempting to access an internal network of the computing device 104. As yet another example, the threat 110 may include the user of the computing device 104 improperly using the computing device 104 and/or the data 124. Other types of threats are contemplated.

The data risk component 112 may be configured to determine a data risk value for data of an endpoint. An endpoint may refer to a device or a node that is connected to a network. An endpoint may communicate across the network with other devices, such as other endpoints, services, or servers. For example, endpoints of a network may include individual computing devices connected to the network, such as desktops, laptops, smartphones, tablets, mobile devices, or other computing devices. For instance, the computing device 104 may be an endpoint of the network 106, and the data risk component 112 may determine a data risk value for the data 124 of the computing device 104.

A data risk value may refer to a measurement of risk posed by unauthorized action, occurrence, or event relating to data. Risk of data may refer to exposure to danger, harm, loss, or other negative consequence of unauthorized action, occurrence, or event relating to the data. For example, a data risk value for the data 124 including classified files may refer to a measurement of risk posed by an unauthorized action, occurrence, or event relating to the classified files. For instance, the data risk value for the data 124 may refer to a quantification of exposure to danger, harm, loss, or other negative consequence, unauthorized action, occurrence, or event relating to leakage or destruction of the classified files.

In some embodiments, a data risk value for data may be determined based on user input. For example, a user may manually indicate the data risk value for one or more classified files within the data 124, and the data risk component 112 may retrieve the data risk value indicated by the user. In some embodiments, the data risk value may be determined based on a number of classified files within data 124. For example, the data risk component 112 may traverse the folder(s) containing the classified files within the data 124 and determine the data risk value for the data 124 based on how many classified files are found within the data 124. Larger data risk value may correspond to greater number of classified files.

In some embodiments, the data risk value may be determined based on type(s) of classified files within the data. For example, the data risk component 112 may identify the type(s) of the classified files within the data 124 and determine the data risk value for the data 124 based on different type(s) of classification categories with which the classified files are associated. Larger data risk value may correspond to higher classification categories (e.g., reflecting a higher sensitivity or a greater amount of classified information within the files).

In some embodiments, the data risk value may range between values of zero and one. A "zero" data risk value may indicate that there is no risk posed by unauthorized action, occurrence, or event relating to data. For example, data of publicly accessible information may have a data risk value of zero. A "one" data risk value may indicate the highest risk posed by unauthorized action, occurrence, or event relating to data. A data risk value of one may be determined based on sensitivity or classified nature of information within the data or the amount of sensitive information or classified information within the data. For example, a small amount of highly sensitive/classified information may have a data risk value of one. As another example, a large amount of low or moderately sensitive/classified information may have a data risk value of one. Other ranges of data risk value are contemplated.

For example, the determination of the data risk value may include the following calculation: data risk score (RSD)=1−$e^{-\alpha K}$, where K is the number of classified files within the data and $\alpha$ is a positive number. The value of $\alpha$ may be configurable, and may be adjusted based on user input or content of the classified files. For instance, the value of $\alpha$ may change based on the sensitivity or type of the classified information within the data, or based on the size of the sensitive/classified file(s) within the data. Other values and calculations of data risk values are contemplated.

The endpoint risk component 114 may be configured to determine an endpoint risk value for an endpoint. For instance, the computing device 104 may be an endpoint of the network 106, and the endpoint risk component 114 may determine an endpoint risk value for the computing device 104.

An endpoint risk value may refer to a measurement of risk that unauthorized action, occurrence, or event relating to data will occur via an endpoint. For example, an endpoint risk value for the computing device may refer to a measurement of risk that unauthorized action, occurrence, or event relating to the data 124 will occur via the computing device 104. For instance, the endpoint risk value for the computing device 104 may refer to a quantification of the possibility or probability that unauthorized action, occurrence, or event relating to the data 124 will occur at or through the computing device 104.

In some embodiments, the endpoint risk value may be determined based on a user risk value and a cyber security risk value. For example, the endpoint risk value may be determined based on a combination of the user risk value and the cyber security risk value. For instance, the endpoint risk value may be determined as a sum or other combination of the user risk value and the cyber security risk value.

A user risk value may refer to a measurement of risk that unauthorized action, occurrence, or event relating to data will occur due to a user action or a user inaction. For example, a user risk value may refer to a quantification of the possibility or probability that unauthorized action, occurrence, or event relating to the data 124 will occur because of one or more users of the computing device 104. A user may intentionally or unintentionally pose risk to the unauthorized use of data. For example, a user may intentionally or unintentionally leak classified files to unauthorized persons through the computing device 104.

In some embodiments, a user risk value for an endpoint may be determined based on user behavior associated with data or an endpoint. A user behavior may refer to a way in which a user acts with respect to data stored at a particular endpoint, other endpoints, data stored at the particular endpoint, or other data. The endpoint risk component 114 may analyze user behavior with respect to a particular piece of data, other pieces of data, a particular endpoint, or other endpoints to determine the user risk value for the particular endpoint. The endpoint risk component 114 may analyze a variety of user behaviors to determine the user risk value. For example, the endpoint risk component 114 may take into consideration the number of times the user has visited a malicious website, whether the user has visited a certain number of malicious websites within a given time period, whether the user has previously allowed malware to be installed on an endpoint, whether the user has shared an infected file with other users, where the user is located, the locations to which the user has traveled, the persons or devices with which the user has interacted, status of the user in an organization (e.g., importance/role within the organization, newly hired, recently resigned), or other behaviors of the user.

Larger user risk value may correspond to higher risk that the user will intentionally or unintentionally allow unauthorized action, occurrence, or event relating to data to occur. Different behaviors of user may be weighed the same or differently in determining the user risk value. For example, a user having recently visited a malicious website may be weighed the same or differently from the user having been recently hired in the determination of the user risk value.

In some embodiments, the user risk value may range between values of zero and one-hundred. A "zero" user risk value may indicate that there is no risk that unauthorized action, occurrence, or event relating to data will occur due to a user action or a user inaction. A "one-hundred" user risk value may indicate the highest risk that unauthorized action, occurrence, or event relating to data will occur due to a user action or a user inaction. Other ranges of user risk value are contemplated.

For example, the determination of the user risk value may include the following calculation: user risk score (RSU)= $100*(1-e^{-V})$, where $V=\gamma_1*N+\gamma_2*f+\gamma_3*s+\gamma_4*M+\ldots$, each $\gamma_j>0$ is a configurable parameter providing weights to occurrence of different user behaviors, N is the number of times the user has allowed unauthorized action, occurrence, or event relating to data to occur (within a given time period), M is the number of times that the user's peers (e.g., co-workers with whom the user interacts or shares data) have allowed unauthorized action, occurrence, or event relating to data to occur (within a given time period), and f and s are flags (having a value of zero or one) that indicate whether the user or the user's peers have exhibited the corresponding user behavior (within a given time period). Other user behaviors or factors may be taken into consideration by including other gamma and corresponding flag or number of occurrences into the user risk value calculation. Other values and calculations of user risk values are contemplated.

A cyber security risk value may refer to a measurement of risk that unauthorized action, occurrence, or event relating to data will occur due to one or more vulnerabilities at an endpoint. For example, a cyber security risk value may refer to a quantification of the possibility or probability that unauthorized action, occurrence, or event relating to the data 124 will occur because of one or more vulnerabilities of the computing device 104. A vulnerability of an endpoint may refer to a flaw (in code or design) of an endpoint that creates a potential point of security comprise at the endpoint. A vulnerability of an endpoint may exist due to one or more malicious programs (e.g., malware installed at an endpoint). A vulnerability of an endpoint may exist due to a flaw in software/firmware of the endpoint (e.g., security flaw that has yet to be addressed by a patch or an update).

In some embodiments, a cyber security risk value for an endpoint may be determined based on a number of vulnerabilities of the endpoint. The endpoint risk component 114 may scan the endpoint to determine the number of vulnerabilities existing at the endpoint, such as the number of malware running on the endpoint or the number of security updates to be applied to the endpoint.

Larger cyber security risk value may correspond to higher risk that unauthorized action, occurrence, or event relating to data will occur due to the endpoint. Different vulnerabilities of an endpoint may be weighed the same or differently in determining the cyber security risk value. For example, the presence of a malware on an endpoint may be weighed the same or differently from the endpoint having a security update that has not yet been applied. As another example, different malware on the endpoint may be weighed the same or differently, and the weights of the unapplied security update may be changed based on the type of fix applied by the security update or the duration of time that the security update has been available.

In some embodiments, the cyber security risk value may range between values of zero and one-hundred. A "zero" cyber security risk value may indicate that there is no risk that unauthorized action, occurrence, or event relating to data will occur due to an endpoint or a vulnerability at an endpoint. A "one-hundred" cyber security risk value may indicate the highest risk that unauthorized action, occurrence, or event relating to data will occur due to an endpoint or a vulnerability at an endpoint. Other ranges of user risk value are contemplated.

For example, the determination of the cyber security risk value may include the following calculation: cyber security risk score (RSCS)=$100*(1-e^{-V})$, where V=$\gamma_1*N+\gamma_2*f_2+\gamma_3*f_3+\gamma_4*f_4+\gamma_5*f_5+\gamma_6*K+\gamma_{7.1}*N_1+\gamma_{7.2}*N_2+\gamma_{7.3}*N_3$ . . . , each $\gamma_1, \gamma_2, \gamma_3, \gamma_4, \gamma_5, \gamma_6, \gamma_{7.1}, \gamma_{7.2}, \gamma_{7.3} > 0$ are configurable parameters providing weights to different vulnerabilities, N is the number of one or more types of vulnerabilities detected at the endpoint, $f_2, f_3, f_4, f_5$ are flags (having value of zero or one) that indicate whether certain vulnerabilities are detected at the endpoint, K is the number of one or more types of vulnerabilities detected at the user's peer endpoints, and $N_1, N_2, N_3$ are the numbers of particular activities (e.g., visits to safe external websites, visits to risky external website, reception of files from unknown sources) performed at the endpoint. Other vulnerabilities or factors may be taken into consideration by adding other gamma and corresponding flag or number of occurrences into the cyber security risk value calculation. Other values and calculations of cyber security risk values are contemplated.

The channel risk component 116 may be configured to determine a channel risk value for a set of channels through which data of an endpoint is conveyable by the endpoint. For instance, the computing device 104 may be an endpoint of the network 106, and the channel risk component 116 may determine a channel risk value for a set of channels through which the data 124 of the computing device 104 is conveyable by the computing device 104.

A set of channels may refer to one or more channels through which an endpoint may convey data. For example, a set of channels for the computing device 104 may include one or more channels through which the computing device 104 may convey some or all of the data 124. A channel may refer to a path through which information may flow. A channel may refer to the medium through which information may flow or a program that is used to convey information through a medium. For example, a set of channels of the computing device 104 may include wired or wireless connection, peripheral connectors (e.g., USB connector), email program, texting program, virtual chat program, or video conferencing program. Other types of channels are contemplated.

A channel risk value may refer to a measurement of risk that unauthorized action, occurrence, or event relating to data will occur via a set of channels. For example, a channel risk value for the computing device may refer to a measurement of risk that unauthorized action, occurrence, or event relating to the data 124 will occur via one or more channels of the computing device 104. For instance, the channel risk value for the computing device 104 may refer to a quantification of the possibility or probability that unauthorized action, occurrence, or event relating to the data 124 will occur at or through one or more channels of the computing device 104.

In some embodiments, a channel risk value may be determined based on a number of channels within the set of channels. For example, the channel risk component 116 may determine the number of channels through which the computing device 104 may exchange information relating to the data 124 and determine the channel risk value for the computing device 104 based on the number of channels. Larger channel risk value may correspond to a greater number of channels.

In some embodiments, the channel risk value may be determined based on the type(s) of channels within the set of channels. A type of channels may refer to a category of channels, such as categories of medium through which information may flow, categories of programs that are used to convey information through a medium, or categories of security associated with different channels (e.g., unsecured channel, lowly secured channel, moderately secured channel, highly secured channel). For example, the channel risk component 116 may identify the type(s) of channels by which the computing device 104 may convey the data 124 or information relating to the data, and determine the channel risk value for the computing device 104 based on different type(s) of channels of the computing device 104.

In some embodiments, the channel risk value may range between values of zero and one. A "zero" channel risk value may indicate that there is no risk that unauthorized action, occurrence, or event relating to data will occur via the channel(s) of the endpoint. For example, the channel(s) of the endpoint may be protected by security measure(s) to protect leakage of classified files. A "one" channel risk value may indicate the highest risk that unauthorized action, occurrence, or event relating to data will occur via the channel(s) of the endpoint. Other ranges of channel risk value are contemplated.

For example, the determination of the channel risk value may include the following calculation: channel risk score (RSC)=$1-e^{\beta*M}$, where M is the number of channels through which unauthorized action, occurrence, or event relating to data may occur and $\beta$ is a positive number. The value of $\beta$ may be configurable, and may be adjusted based on the type of the channels. For instance, value of $\beta$ may change based on security measures in place to prohibit unauthorized action, occurrence, or event relating to data to occur through a channel. For example, an email program may be secured using scanners to prevent leakage of classified files and have a lower $\beta$ value than a chat program, which may not be secured or have less extensive security measures than the email program. As another example, the determination of the channel risk value may include the following calculation:

$RSC = 1 - e^{-V}$, where $V = \mu_1 + \mu_2 + \ldots \mu_M$, $\mu_j > 0$, $j = 1, \ldots, M$, M is the number of channels, and $\mu_1, \mu_2, \ldots \mu_M$ represent risk values for different channels. Other values and calculations of channel risk values are contemplated.

The data security risk component 118 may be configured to determine a data security risk value based on the data risk value, the endpoint risk value, and the channel risk value. For example, the data security risk value may be determined based on a combination of the data risk value, the endpoint risk value, and the channel risk value. For instance, the data security risk value may be determined as a product or other combination of the data risk value, the endpoint risk value, and the channel risk value. The data security risk component 118 may take other information or factors into account in determining a data security risk value.

A data security risk value may refer to a comprehensive measurement of risk posed by unauthorized action, occurrence, or event relating to data at an endpoint. A data security risk value may take into account: the data risk value (measurement of risk posed by unauthorized action, occurrence, or event relating to data), the endpoint risk value (measurement of risk that unauthorized action, occurrence, or event relating to data will occur via an endpoint), and/or the channel risk value (measurement of risk that unauthorized action, occurrence, or event relating to data will occur via a set of channels).

In some embodiments, calculation of the data security risk value (RSDS) as a product of the data risk value, the endpoint risk value, and the channel risk value (RSDS=RSD*RSE*RSC) may provide a data security risk value that ranges between values of zero and two-hundred. The endpoint risk value (RSE, combination of user risk value and cyber security risk value) may provide granular risk measurement (values ranging from zero to two-hundred) based on user behavior and endpoint vulnerabilities, while the data risk value (RSD, ranging from zero to one) and the channel risk value (RSC, ranging from zero to one) may determine how much of the endpoint risk value should be taken into account when detecting data leaking threats.

Thus, the risk values may be determined based on a triplet model including three separate elements: (1) the data at the endpoint, (2) the endpoint, and (3) the channels of the endpoint. Granular measurements of risk may be calculated based on user behavior and endpoint vulnerabilities, and the granular measurements may be weighed or adjusted based on the risks posed by both the data and the channel. The use of the triplet model for evaluating data security risks may provide for more flexible and nuanced threat detection than threat detection based on recognition of problematic events. The use of the triplet model for evaluating data security risks may enable tailoring of threat detection to different security policies with different rules relating to the data risk value, the endpoint risk value, the channel risk value, or the data security risk value.

The separation of the risk determination into three elements of the triplet model may facilitate independent changes, updates, or optimization of risk calculations for the separate elements. For instances, factors taken into account when calculating the data risk value, the endpoint risk value, or the channel risk value may independently be changed. Factors taken into account when calculating the data risk value, the endpoint risk value, or the channel risk value may be changed to reflect the desired security policies. The triplet model for evaluating data security risks may merge into a single view risk arising from the classification of data, the vulnerabilities of an endpoint, the user behavior, and the channels. The single view may enable computer analysis of different aspects of a computing system for threat detection while providing a comprehensive view of how different aspects of the computing system contribute to the overall risk faced by the computing system.

Figure 1C:
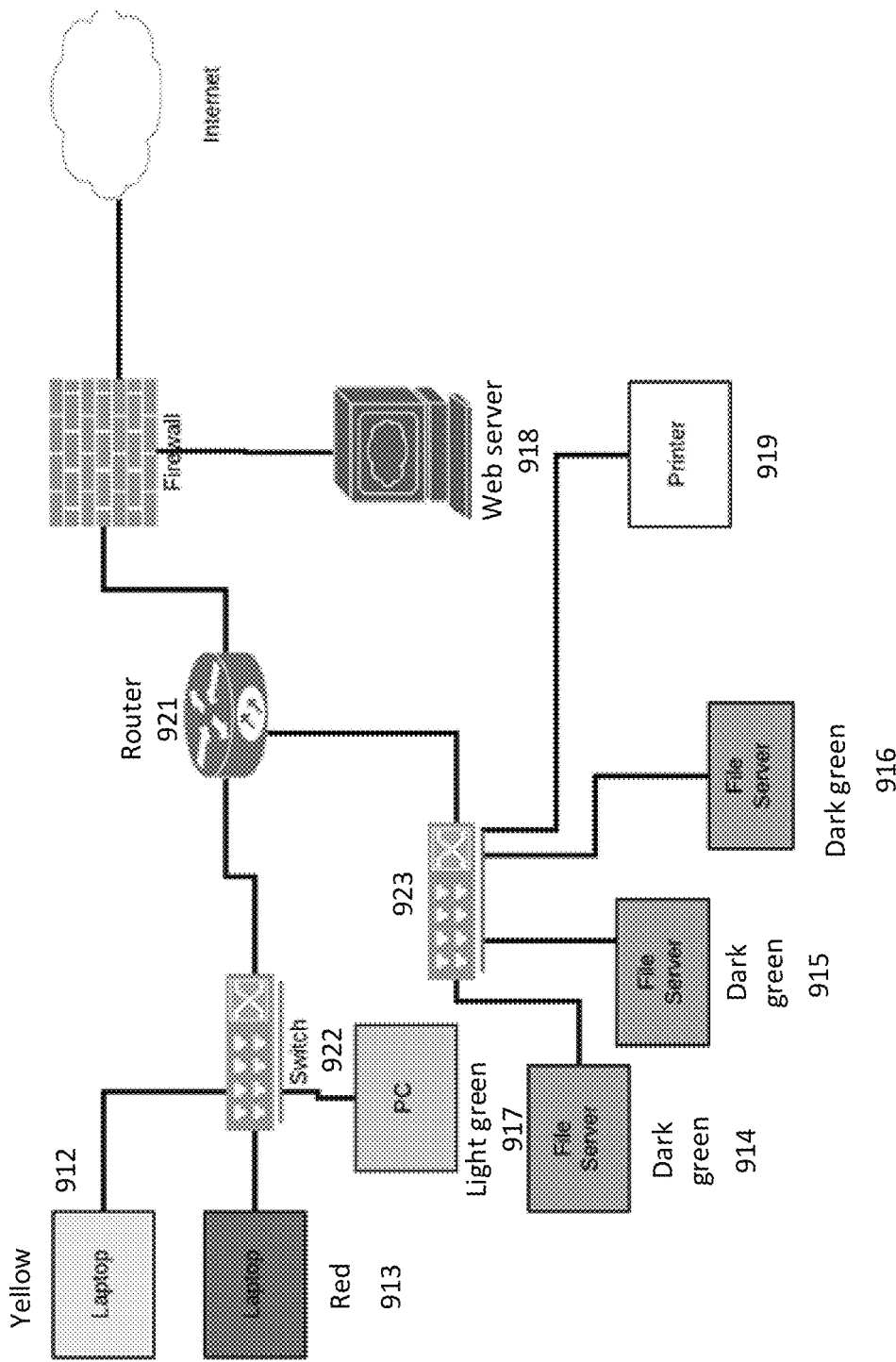
FIG. 1C illustrates an exemplary map showing security risk levels, in accordance with various embodiments of the disclosure.

The rendering component 119 may be configured to render a map showing a security risk level of the endpoint. The security risk level may be based on the data risk value, the endpoint risk value, and/or the channel risk value. For example, the security risk level may be based on the data risk value, the endpoint risk value, the channel risk value, or the data security risk value as shown in FIG. 1C, or any combination thereof. The security risk level may be based on additional elements, such as the amount of data accessible to (e.g., stored in) the endpoint, the data amount in each security category, etc.

In some embodiments, the map may be any type of rendering providing information of the security risk level. For example, the map may be a visual and/or audio display of the security risk level. As shown in FIG. 1C, the map may render the computing system 111 including the various computing devices (e.g., laptop, computer, server, printer, etc.). The map may also render the security risk level for each of one or more of the computing devices. For example, as shown, the security levels may be color-coded in association with the computing devices respectively. The color may represent the gravity of the security risk. For example, red may represent the greatest security risk. Yellow may represent an intermediate level of security risk. Green may represent little or no risk.

Figure 1D:
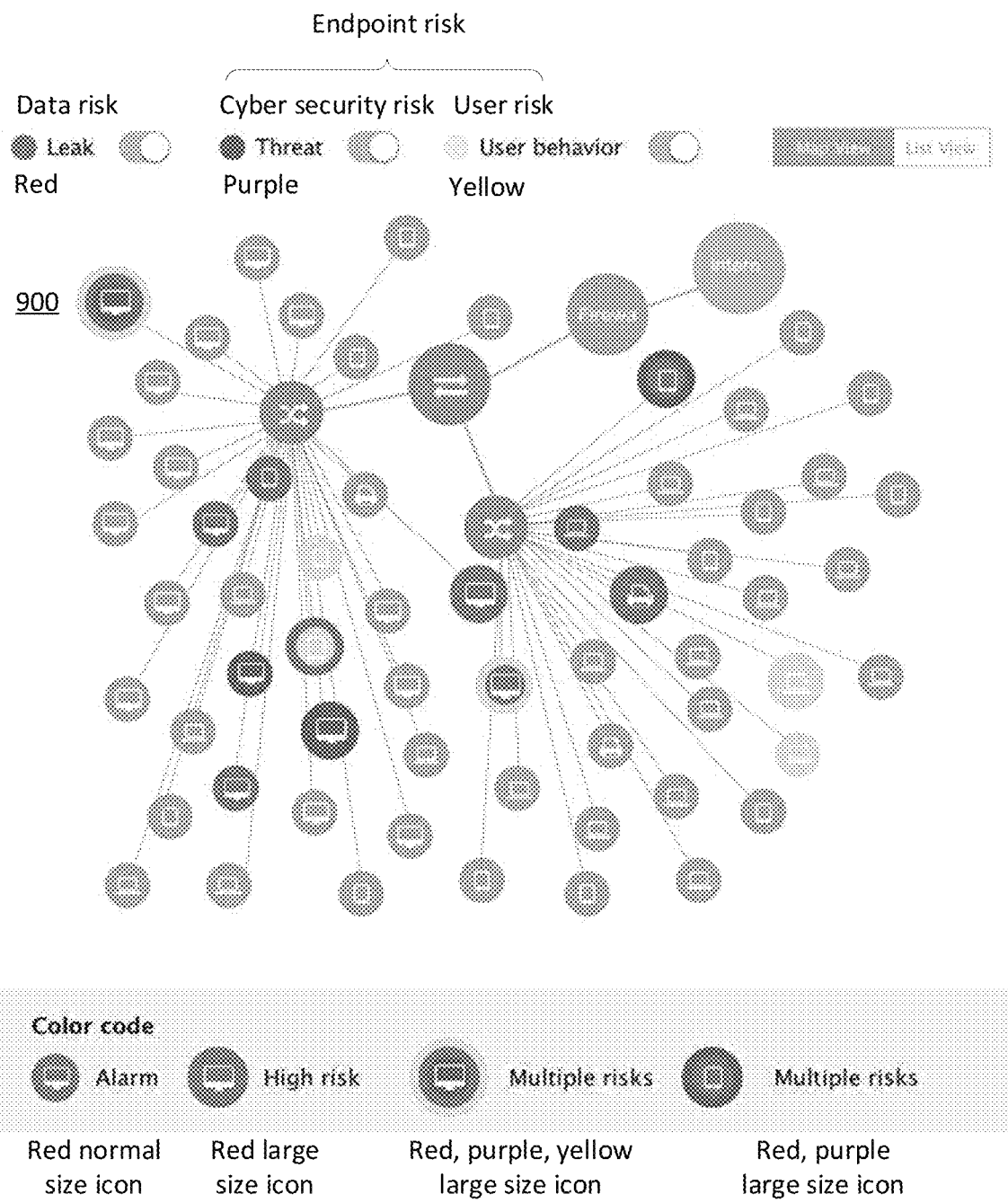
FIG. 1D illustrates an exemplary map showing security risk levels, in accordance with various embodiments of the disclosure.

In some embodiments, as shown in FIG. 1D (a map view) and FIG. 1E (a list view), multiple colors in association with multiple securities risk levels may be shown for each computing device. Further, additionally or alternatively to colors, icons with different appearances (e.g., different sizes, different shapes) can be used to represent the various security risk levels. As shown, FIG. 1D and FIG. 1E may render the data risk (labelled in red as "leak"), cyber security risk (labeled in purple as "threat"), and user risk (labeled in yellow as user behavior) described above. Similarly and additionally, other risks such as the channel risk value may be also rendered. Two or more of the risks may be combined. For example, the endpoint risk may be derived based on the cyber security risk and the user risk.

The various risks may be shown in respective colors to distinguish from one another. The various risks may be rendered if their associated risk values respectively exceed their thresholds. In one example, computing device 900 has its associated data risk value, cyber security risk value, and the user risk value exceeding their thresholds respectively. Thus, in FIG. 1D map view, computing device 900 is shown as a triple color icon representing the presence of data risk, cyber security risk, and user risk. Similarly, risks associated with other computing devices in the system may be similarly rendered to provide an intuitive view of the system's security status. Also, multiple computing devices may be grouped together to associate with a security risk value and a security risk level. The rendering of each risk can be toggled to turn on or off. Also, the map view and list view can be toggled. As shown in FIG. 1E list view, the various risks for the computing device 900 can be decoupled in a table form.

In some embodiments, the security risk level can be represented by a vector V=(DATA, data risk value, cyber security risk value, user risk value, . . . ). The dimension of V is N. The first parameter DATA itself may be another vector (d, d1, d2, . . . , dm), where d1, d2, . . . , dm respectively represent the data amount for each data category (e.g., categories that organize data accessible to the computing device by security risks), and d represents the total amount of confidential data of all the categories d1, d2, . . . , dm. According, the vector V may be created for each group of one or more computing devices by collecting information from each of them. These vectors can be used for security analysis.

In some embodiments, the color-coded map may enhance the performance of security analysts for security analysis and risk evaluation. A few colors may be assigned to a node depending on the risk scores. For example, there can be (N+m) colors for indicating the risk levels on the map, where the vector V has N dimensions, and the DATA has (m+1) dimensions.

In some embodiments, multiple maps can be used for showing correlations between different security perspectives. In one example, if an analyst wants to know whether bad user behavior would lead to cyberthreat such as computer virus infection, the analyst can compare the map showing the cyber security risk and another showing user risk (or use one map that shows both risks). In another example, if an analyst wants to know whether data leak incidents is relevant to cyber security risk or bad user behavior, the analyst can look at the three colorful maps involving the data risk, the cyber security risk, and the user risk (or one combined map such as FIG. 1D which shows all risks).

Referring back to FIG. 1B, the detection component 120 may be configured to detect a threat (e.g., the threat 110) based on the data security risk value. For example, the detection component 120 may detect a threat based on the data security risk value satisfying a threat detection criterion. A threat criterion may refer to one or more rules or standards by which a threat is detected. For instance, a threat may be detected based on the data security risk value being the same as or greater than a threat threshold. The detection component 120 may take other information or factors into account in detecting a threat.

A threat detected by the detection component 120 may refer to potential unauthorized action, occurrence, or event relating to computing device 104. For example, the threat 110 may refer to potential unauthorized action, occurrence, or event relating to the data 124 of the computing device 104, such as leakage or destruction of the data 124. Detection of other threats are contemplated.

The threat threshold may be static or dynamic. The threat threshold may be set by a user (e.g., user defining the value of the threat threshold). The threat threshold may be automatically set based on occurrence of one or more events. For example, the threat threshold may be lowered based on the computing device 104 or the network 106 operating in a high-security mode and raised based on the computing device 104 or the network 106 operating in a low-security mode.

In some embodiments, the detection of a threat, the data security risk value, or values underlying the data security risk value may be presented within a user interface. For example, based on a threat being detected based on the data security risk value satisfying a threat detection criterion, the data security risk value may be presented within a user interface as shown in FIG. 1C to FIG. 1E. The user interface may also provide values of the data risk value, the endpoint risk value, and the channel risk value. The endpoint risk value may be broken out into the user risk value and the cyber security risk value. Different values that make up the data security risk value may be presented differently (e.g., in different fonts, in different colors).

The presentation of different values that make up the data security risk value may enable analysis of which area(s) of security needs to be improved. For example, a high data security risk value for an endpoint may be the result of a high user risk value. To reduce the risk of threat for the endpoint, the user may be required to attend training on proper computing behavior to reduce the user risk value. The data of the endpoint may be limited to non-classified files or files with low-sensitivity to reduce the data risk value. The channels available at the endpoint may be limited (e.g., reduce the number of channels, increase security measures in place for the channels) to reduce the channel risk value. For example, the router or the firewall may block the Internet access of the computing device at risk. For another example, the computing device at risk may be locked or quarantined to deny any user access.

In some embodiments, remedial measures may be suggested or taken based on detection of threats. Based on detection of a threat, information relating to data, data risk value, endpoint, endpoint risk value, channel, channel risk value, or data security risk value may be analyzed to determine what actions may be taken to reduce or remove the threat. For example, one or more aspects of data, endpoint vulnerabilities, user behavior, or channels may be tagged for further view or analysis. One or more changes to data, endpoint, user behavior, or channels may be suggested or automatically taken to reduce the data security risk value.

Figure 2:
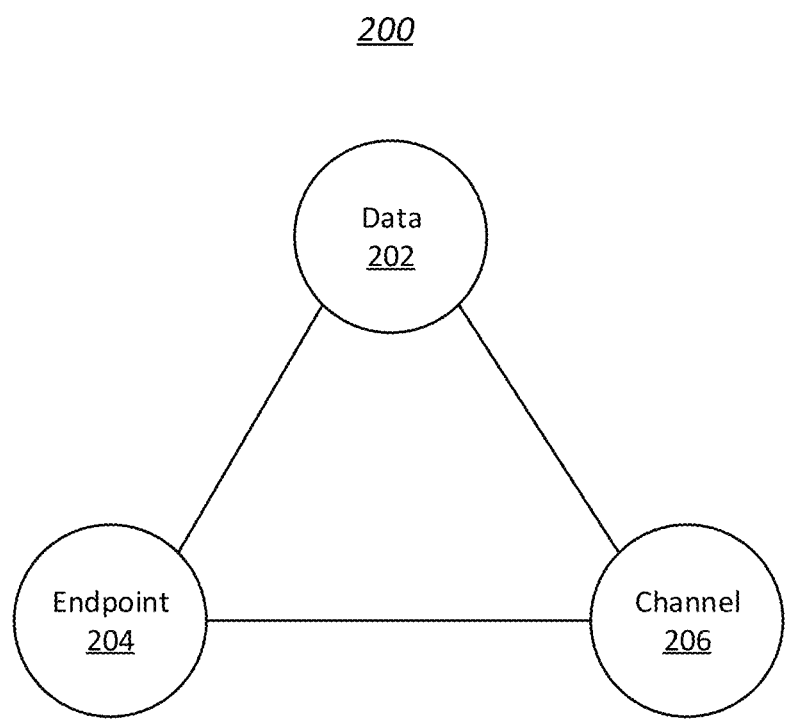
FIG. 2 illustrates an exemplary triplet model for performing security analysis, in accordance with various embodiments of the disclosure.

FIG. 2 illustrates an exemplary triplet model 200 for evaluating data security risks, in accordance with various embodiments of the disclosure. The triplet model 200 include three elements: a data 202, an endpoint 204, and a channel 206. The data 202 may represent risks due to confidential data at rest in an endpoint. The endpoint 204 may represent risks due to actors at the endpoints, including user(s) at the endpoint and vulnerabilities (e.g., malware, unpatched security flaw) at the endpoint. The channel 206 may represent risks due to channel(s) which may allow unauthorized access of data at the endpoint. Individual elements 202, 204, and 206 of the model 200 may contribute risks to potential threats at an endpoint. Risk values associated with individual elements 202, 204, 206 may be separately analyzed and combined together to form a comprehensive model for evaluating data security risks. Risk values associated with individual element 202, 204, 206 may be determined independently of each other. Risk values associated with individual elements 202, 204, 206 may be calculated using separate sets of algorithm. Individual sets of algorithm may be modified (e.g., changed, updated, improved) independently of each other. For example, factors taken into consideration for determination of risk values associated with the data 202 may be changed to include additional factors without impacting calculation of risk values for the endpoint 204 or the channel 206.

Figure 3:
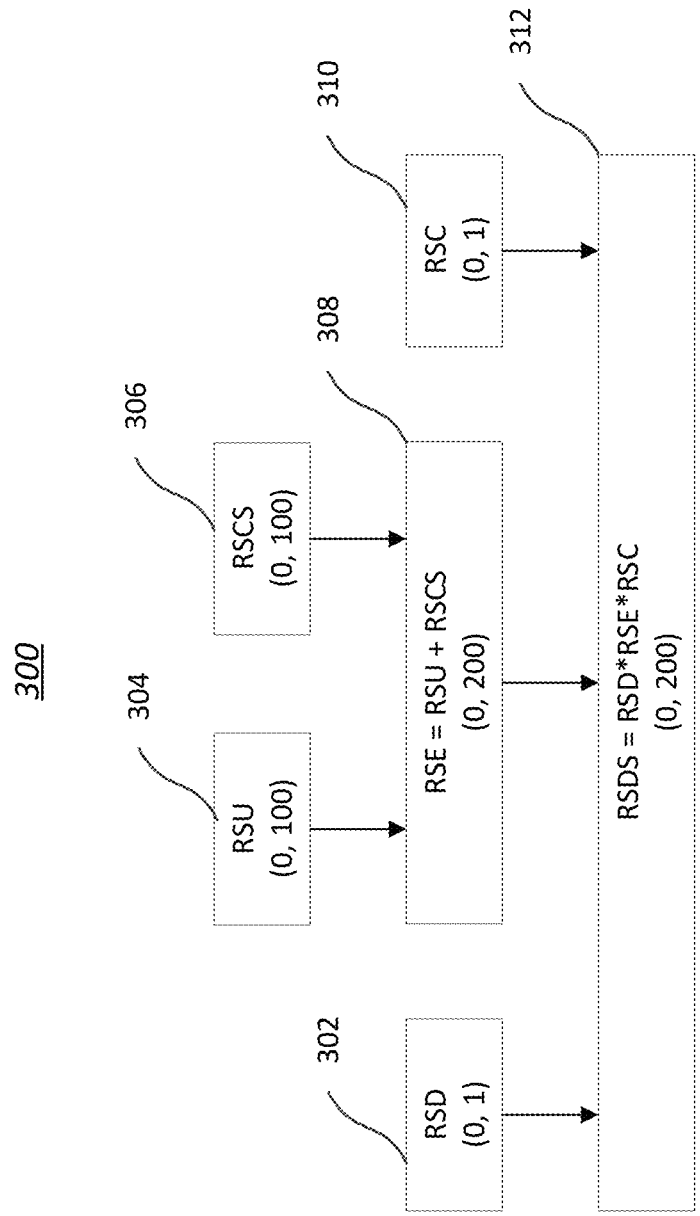
FIG. 3 illustrates an exemplary flow of performing security analysis, in accordance with various embodiments of the disclosure.

FIG. 3 illustrates an exemplary flow 300 of risk value calculations, in accordance with various embodiments of the disclosure. The flow 300 may include calculations 302, 304, 306, 308, 310, 312 of different risk values for an endpoint. The calculation 302 may include a calculation of a data risk value (data risk score, RSD). The data risk value may range from zero to one, with zero being the lowest risk value and one being the highest risk value.

The calculation 304 may include a calculation of a user risk value (user risk score, RSU). The user risk value may range from zero to one hundred, with zero being the lowest risk value and one hundred being the highest risk value.

The calculation 306 may include a calculation of a cyber security risk value (cyber security risk score, RSCS). The cyber security risk value may range from zero to one hundred, with zero being the lowest risk value and one hundred being the highest risk value.

The calculation 308 may include a calculation of an endpoint risk value (endpoint risk score, RSE) based on a combination of the user risk value and the cyber security risk value. For example, the endpoint risk value may be the sum of the user risk value and the cyber security risk value. The endpoint risk value may range from zero to two hundred, with zero being the lowest risk value and two hundred being the highest risk value.

The calculation 310 may include a calculation of the channel risk value (channel risk score, RSC). The channel risk value may range from zero to one, with zero being the lowest risk value and one being the highest risk value.

The calculation 312 may include a calculation of a data security risk value (data security risk score, RSDS) based on a combination of the data risk value, the endpoint risk value, and the channel risk value. For example, the data security risk value may be the product of the data risk value, the endpoint risk value, and the channel risk value. The data security risk value may range from zero to two hundred, with zero being the lowest risk value and two hundred being the highest risk value. Other ranges of risk values and other calculations of risk values are contemplated.

Figure 4:
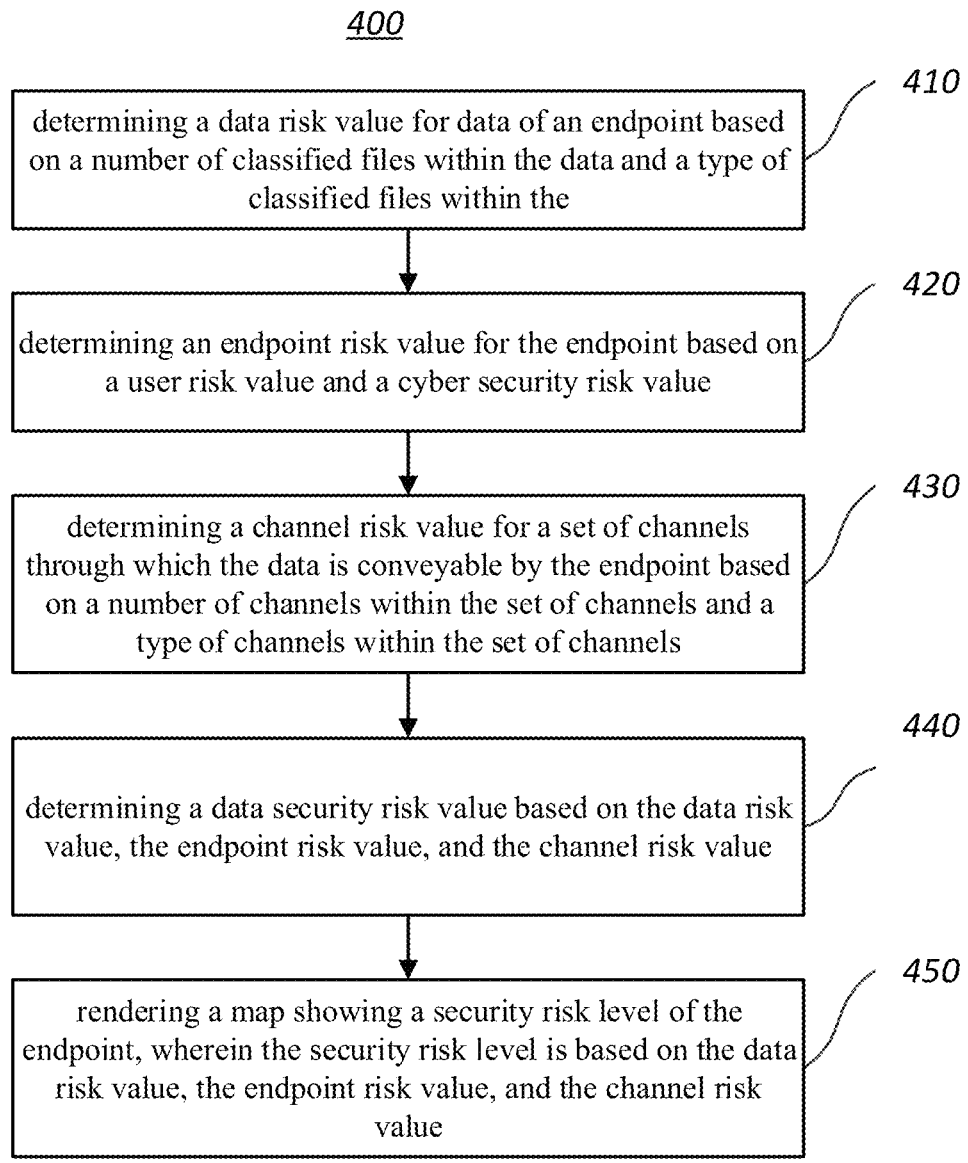
FIG. 4 illustrates a flow chart of an exemplary security analysis method, in accordance with various embodiments of the disclosure.

FIG. 4 illustrates a flowchart of an exemplary method 400, according to various embodiments of the present disclosure. The method 400 may be implemented in various environments including, for example, the system 111 of FIG. 1A, the environment 100 of FIG. 1B, etc. The operations of the method 400 presented below are intended to be illustrative. Depending on the implementation, the method 400 may include additional, fewer, or alternative steps performed in various orders or in parallel. The method 400 may be implemented in various computing systems or devices including one or more processors.

With respect to the method 400, block 410 includes determining a data risk value for data of an endpoint based on a number of classified files within the data and a type of classified files within the data.

Block 420 includes determining an endpoint risk value for the endpoint based on a user risk value and a cyber security risk value. In some embodiments, the user risk value is determined based on a user behavior associated with the data or the endpoint. In some embodiments, the cyber security risk value is determined based on a number of vulnerabilities of the endpoint.

Block 430 includes determining a channel risk value for a set of channels through which the data is conveyable by the endpoint based on a number of channels within the set of channels and a type of channels within the set of channels. The data may be conveyed by the endpoint through the set of channels.

Optional block 440 includes determining a data security risk value based on the data risk value, the endpoint risk value, and the channel risk value. In some embodiments, the data security risk value is a product of the data risk value, the endpoint risk value, and the channel risk value. Further, a threat may be detected based on the data security risk value.

Block 450 includes rendering a map showing a security risk level of the endpoint, wherein the security risk level is based on the data risk value, the endpoint risk value, and the channel risk value. For example, the security risk level is based on the data security risk value. In some embodiments, the security risk level is based on the data risk value, the endpoint risk value, the channel risk value, and an amount of data accessible by (e.g., stored in) the endpoint. In some embodiments, rendering the map showing the security risk level of the endpoint comprises: determining a data security risk value based on the data risk value, the endpoint risk value, and the channel risk value; and rendering the map based on the data security risk value. In some embodiments, the endpoint comprises a computing device; and rendering the map showing the security risk level of the endpoint comprises: rendering the map showing the endpoint and its connection with one or more other endpoints in a network and showing one or more risk levels of the one or more other endpoints. In some embodiments, the security risk level is represented by an icon with at least one of an associated color, size, or shape.

One or more blocks of the method 400 may be performed by one or more computer components that are the same as or similar to the components of the computing system 102 shown in FIG. 1B. For example, the block 410 may be performed by a computer component the same as or similar to the data risk component 112. The block 420 may be performed by a computer component the same as or similar to the endpoint risk component 114. The block 430 may be performed by a computer component the same as or similar to the channel risk component 116. The block 440 may be performed by a computer component the same as or similar to the data security risk component 118. The block 450 may be performed by a computer component the same as or similar to the detection component 120. In one example, the method 400 may be performed by the computing system 102 or one or more similar devices.

One or more blocks of the method 400 may correspond to calculations performed to determine risk values of one or more elements of the triplet model 200 shown in FIG. 2 for evaluating data security risks and to one or more calculations of the flow 300 of risk value calculations shown in FIG. 3. For example, the block 410 may correspond to calculation(s) performed to determine risk value of the data 202 (the calculation 302). The block 420 may correspond to calculation(s) performed to determine risk value of the endpoint 204 (the calculations 304, 306, 308). The block 430 may correspond to calculation(s) performed to determine risk value of the channel 206 (the calculation 310). The block 440 may correspond to calculation(s) performed to determine the overall data security risk value of the triplet model 200 (the calculation 312).

Figure 5:
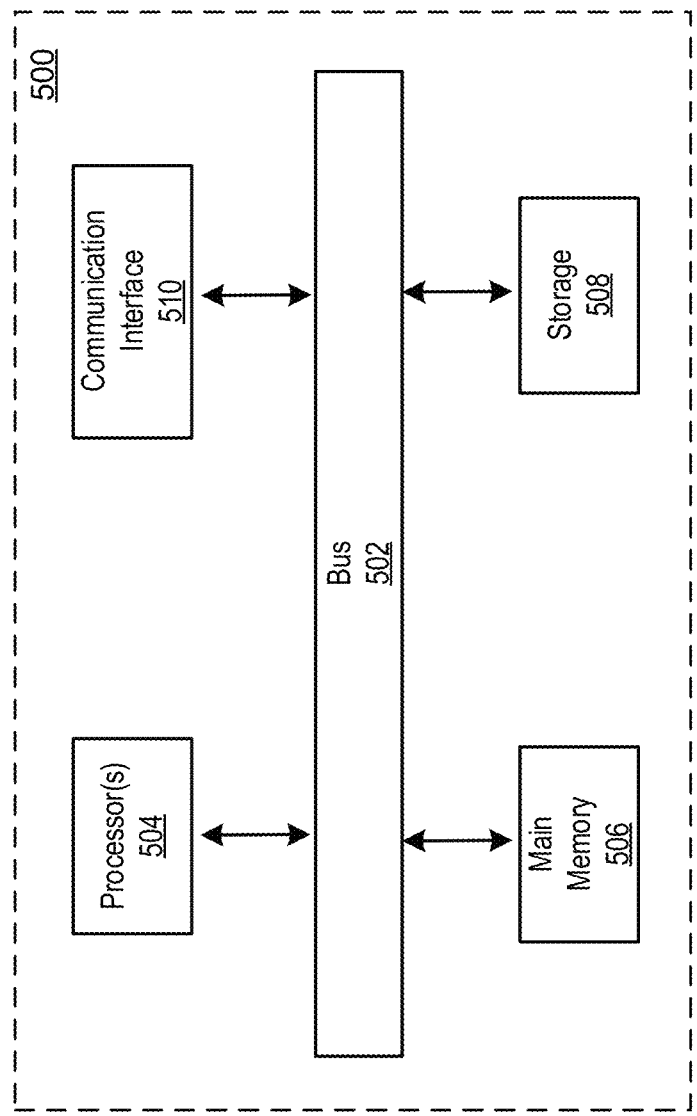
FIG. 5 illustrates a block diagram of an exemplary computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor(s) 504. Main memory 506 also may be used for storing temporary variables or other intermediate information during execution of instructions to be executed by processor(s) 504. Such instructions, when stored in storage media accessible to processor(s) 504, render computer system 500 into a special-purpose machine that is customized to perform the operations specified in the instructions. Main memory 506 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, an EPROM, a FLASH-EPROM, NVRAM, any other memory chip or cartridge, and networked versions of the same.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 508. Execution of the sequences of instructions contained in main memory 506 causes processor(s) 504 to perform the process steps described herein.

For example, the computing system 500 may be used to implement the computing system 102 or one or more components of the computing system 102 shown in FIG. 1B. As another example, the process/method shown in FIG. 4 and described in connection with this figure may be implemented by computer program instructions stored in main memory 506. When these instructions are executed by processor(s) 504, they may perform the steps as shown in FIG. 4 and described above. In alternative embodiments, hard-wired circuitry may be used in place of or in combination with software instructions.

The computer system 500 also includes a communication interface 510 coupled to bus 502. Communication interface 510 provides a two-way data communication coupling to one or more network links that are connected to one or more networks. As another example, communication interface 510 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A computer-implemented security analysis method, comprising:
   determining a data risk value for data of an endpoint based on a number of classified files within the data and a type of classified files within the data;
   scanning software and firmware on the endpoint to determine a cyber security risk value based on a number of vulnerabilities of the endpoint;
   determining an endpoint risk value for the endpoint based on a user risk value and the cyber security risk value;
   determining a channel risk value for a set of channels through which the data is conveyable by the endpoint based on a number of channels within the set of channels and a type of channels within the set of channels;
   determining an overall security risk level of the endpoint based on the data risk value, the endpoint risk value, and the channel risk value of the endpoint;
   in response to the overall security risk level being greater than a threshold, displaying the data risk value, the endpoint risk value, and the channel risk value underlying the overall security risk level of the endpoint;
   determining a high risk area based on the data risk value, the endpoint risk value, and the channel risk value; and
   determining actions to reduce risk in the high risk area, wherein different actions correspond to different risk areas, and
   wherein the actions comprise:
      in response to the high risk area corresponding to the channel risk value, blocking Internet access of the endpoint via a router or a firewall;
      in response to the high risk area corresponding to the data risk value, limiting data of the endpoint to non-classified files or files with low sensitivity; and
      in response to the high risk area corresponding to the user risk value in the endpoint risk value, notifying users of the endpoint to attend training on computing behavior.

2. The computer-implemented security analysis method of claim 1, wherein displaying the data risk value, the endpoint risk value, and the channel risk value underlying the overall security risk level of the endpoint comprises:
   displaying the data risk value, the endpoint risk value, and the channel risk value underlying the overall security risk level of the endpoint using different fonts or colors.

3. The computer-implemented security analysis method of claim 1, wherein:
   the endpoint comprises a computing device; and
   displaying the data risk value, the endpoint risk value, and the channel risk value underlying the overall security risk level of the endpoint comprises: rendering a map showing the endpoint and its connection with one or more other endpoints in a network and showing one or more risk levels of the one or more other endpoints.

4. The computer-implemented security analysis method of claim 1, wherein:
   the overall security risk level is represented by an icon with at least one of an associated color, size, or shape.

5. The computer-implemented security analysis method of claim 1, wherein:

the user risk value is determined based on a user behavior associated with the data or the endpoint.

6. The computer-implemented security analysis method of claim 1, wherein:
the cyber security risk value is determined based a number of malware running on the endpoint or a number of security updates to be applied to the endpoint.

7. A security analysis system, comprising one or more processors and one or more non-transitory computer-readable memories coupled to the one or more processors and configured with instructions executable by the one or more processors to cause the system to perform operations comprising:
determining a data risk value for data of an endpoint based on a number of classified files within the data and a type of classified files within the data;
scanning software and firmware on the endpoint to determine a cyber security risk value based on a number of vulnerabilities of the endpoint;
determining an endpoint risk value for the endpoint based on a user risk value and the cyber security risk value;
determining a channel risk value for a set of channels through which the data is conveyable by the endpoint based on a number of channels within the set of channels and a type of channels within the set of channels;
determining an overall security risk level of the endpoint based on the data risk value, the endpoint risk value, and the channel risk value of the endpoint;
in response to the overall security risk level being greater than a threshold, displaying the data risk value, the endpoint risk value, and the channel risk value underlying the overall security risk level of the endpoint;
determining a high risk area based on the data risk value, the endpoint risk value, and the channel risk value; and
determining actions to reduce risk in the high risk area, wherein different actions correspond to different risk areas, and
wherein the actions comprise:
in response to the high risk area corresponding to the channel risk value, blocking Internet access of the endpoint via a router or a firewall;
in response to the high risk area corresponding to the data risk value, limiting data of the endpoint to non-classified files or files with low sensitivity; and
in response to the high risk area corresponding to the user risk value in the endpoint risk value, notifying users of the endpoint to attend training on computing behavior.

8. The security analysis system of claim 7, wherein displaying the data risk value, the endpoint risk value, and the channel risk value underlying the overall security risk level of the endpoint comprises:
displaying the data risk value, the endpoint risk value, and the channel risk value underlying the overall security risk level of the endpoint using different fonts or colors.

9. The security analysis system of claim 7, wherein:
the endpoint comprises a computing device; and
displaying the data risk value, the endpoint risk value, and the channel risk value underlying the overall security risk level of the endpoint comprises: rendering a map showing the endpoint and its connection with one or more other endpoints in a network and showing one or more risk levels of the one or more other endpoints.

10. The security analysis system of claim 7, wherein:
the overall security risk level is represented by an icon with at least one of an associated color, size, or shape.

11. The security analysis system of claim 7, wherein:
the user risk value is determined based on a user behavior associated with the data or the endpoint.

12. The security analysis system of claim 7, wherein:
the cyber security risk value is determined based on a number of malware running on the endpoint or a number of security updates to be applied to the endpoint.

13. A non-transitory computer-readable storage medium for security analysis, configured with instructions executable by one or more processors to cause the one or more processors to perform operations comprising:
determining a data risk value for data of an endpoint based on a number of classified files within the data and a type of classified files within the data;
scanning software and firmware on the endpoint to determine a cyber security risk value based on a number of vulnerabilities of the endpoint;
determining an endpoint risk value for the endpoint based on a user risk value and the cyber security risk value;
determining a channel risk value for a set of channels through which the data is conveyable by the endpoint based on a number of channels within the set of channels and a type of channels within the set of channels;
determining an overall security risk level of the endpoint based on the data risk value, the endpoint risk value, and the channel risk value of the endpoint;
in response to the overall security risk level being greater than a threshold, displaying the data risk value, the endpoint risk value, and the channel risk value underlying the overall security risk level of the endpoint;
determining a high risk area based on the data risk value, the endpoint risk value, and the channel risk value; and
determining actions to reduce risk in the high risk area, wherein different actions correspond to different risk areas, and
wherein the actions comprise:
in response to the high risk area corresponding to the channel risk value, blocking Internet access of the endpoint via a router or a firewall;
in response to the high risk area corresponding to the data risk value, limiting data of the endpoint to non-classified files or files with low sensitivity; and
in response to the high risk area corresponding to the user risk value in the endpoint risk value, notifying users of the endpoint to attend training on computing behavior.

14. The non-transitory computer-readable storage medium of claim 13, wherein the data risk value, the endpoint risk value, and the channel risk value underlying the overall security risk level of the endpoint comprises:
displaying the data risk value, the endpoint risk value, and the channel risk value underlying the overall security risk level of the endpoint using different fonts or colors.

15. The non-transitory computer-readable storage medium of claim 13, wherein:
the endpoint comprises a computing device; and
displaying the data risk value, the endpoint risk value, and the channel risk value underlying the overall security risk level of the endpoint comprises: rendering a map showing the endpoint and its connection with one or more other endpoints in a network and showing one or more risk levels of the one or more other endpoints.

16. The non-transitory computer-readable storage medium of claim 13, wherein:

the overall security risk level is represented by an icon with at least one of an associated color, size, or shape.

17. The non-transitory computer-readable storage medium of claim 13, wherein:
the user risk value is determined based on a user behavior associated with the data or the endpoint.

18. The non-transitory computer-readable storage medium of claim 13, wherein:
the cyber security risk value is determined based on a number of malware running on the endpoint or a number of security updates to be applied to the endpoint.

\* \* \* \* \*